(12) United States Patent
Haba

(10) Patent No.: US 6,227,671 B1
(45) Date of Patent: May 8, 2001

(54) PROJECTOR

(75) Inventor: Shinji Haba, Shiojrri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/612,309

(22) Filed: Jul. 7, 2000

Related U.S. Application Data

(62) Division of application No. 09/244,107, filed on Feb. 4, 1999.

(30) Foreign Application Priority Data

Feb. 13, 1998 (JP) ...................................... 10-31588
Feb. 13, 1998 (JP) ...................................... 10-31589

(51) Int. Cl.[7] ........................ G03B 21/00; G03B 21/26; G03B 21/16; G02F 1/1335
(52) U.S. Cl. ............................... 353/31; 353/33; 353/34; 353/37; 353/60; 353/119; 349/5; 349/8; 349/57
(58) Field of Search ................... 353/31, 32, 34, 353/37, 60, 61, 119; 349/5, 8, 57

(56) References Cited

U.S. PATENT DOCUMENTS 5,743,610  4/1998  Yajima et al. .
5,868,485  2/1999  Fujimori et al. .

*Primary Examiner*—Russell Adams
*Assistant Examiner*—Khaled Brown
(74) *Attorney, Agent, or Firm*—Oliff & Berridge, PLC

(57) ABSTRACT

In a projection display apparatus, an air inlet is formed below an optical modulation device and a color synthesizing system, and a suction fan is placed across the optical modulation device and the color synthesizing system. Thereby the optical modulation device and the color synthesizing system are uniformly cooled by air on the suction side of the suction fan. A structure fixing the optical modulation device and the color synthesizing system is provided with a suction opening cooling the optical modulation device and the color synthesizing system, and this suction opening is covered with a dustproof filter, thereby achieving dust protection.

10 Claims, 9 Drawing Sheets

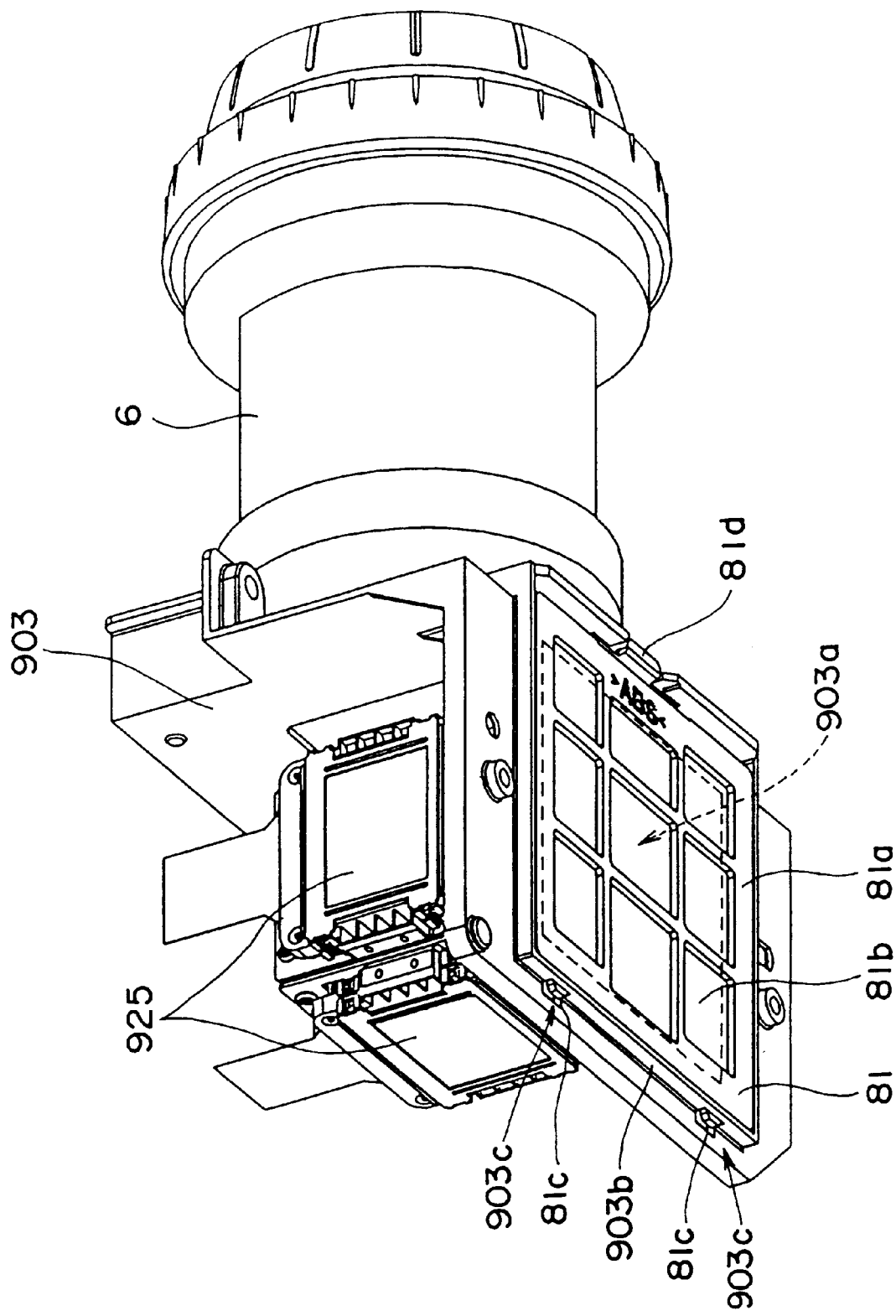

PROJECTOR

This is a Division of Application Ser. No. 09/244,107 filed Feb. 4, 1999. The entire disclosure of the prior application(s) is hereby incorporated by reference herein in its entirety.

BACKGROUND OF THE INVENTION

1. Field of Invention

The present invention relates to a projection display apparatus having an optical system in which an optical image corresponding to image information is formed by optically processing a light beam emitted from a light source, and is enlarged and projected by a projection lens.

2. Description of Related Art

A projection display apparatus is known which comprises an optical system that forms an optical image corresponding to image information by optically processing a light beam emitted from a light source, and enlarges and projects this optical image using a projection lens, a power supply supplying electric power driving the device, an outer casing housing this optical system and the power supply, and a plurality of circuit substrates controlling the optical system.

The optical system in the projection display apparatus normally comprises a color separation system separating light from the light source into light beams of the three primary colors, an optical modulation device emitting the separated light beams as light beams modulated according to image information, and a color synthesizing system synthesizing the respective modulated light beams.

The color separation system has three dichroic mirrors. These dichroic mirrors are housed and arranged together with the light source inside a light guide that serves as a optical component housing and that ensures a predetermined optical path. A light beam from the light source is separated into the three primary colors R, G, and B by the three dichroic mirrors. The optical modulation device has three liquid crystal light valves corresponding to the separated light beams. The separated light beams are respectively modulated by these three light valves according to image information, and are emitted as modulated light beams. The color synthesizing system is constructed by a prism unit that synthesizes the modulated light beams and emits the synthesized light to the projection lens.

In such a projection display apparatus, a cooling mechanism is incorporated to cool the light source, the power supply, the optical system, and the circuit substrates that are heat sources. More specifically, air cooling is introduced from an air inlet formed in the outer casing by a suction fan, is passed via the heat sources disposed inside, and is then exhausted outside from an air outlet formed in the outer casing by an exhaust fan.

Since the light valves constituting the optical system, among the above-mentioned heat sources, are less resistant to heat than the other heat sources, they need to be cooled promptly. For this reason, the conventional cooling mechanism has a structure in which the air inlet of the outer casing is formed below the light valves and the prism, and in which cooling air is forcibly blown against the light valves and the prism by the suction fan near the air inlet.

In addition, since the cooling air is blown against the light valves, the prism, or the like, in the form of a swirling vortex, the light valves, the prism, or the like are not uniformly cooled. Furthermore, the vertical cooling air tends to spread outside the vortex, and therefore, it is difficult to guide the entirety of the cooling air to the light valves, the prism, or the like, which lowers the cooling efficiency for the light valves, the prism, or the like.

On the other hand, when cooling air is drawn unaltered into the inside of the device, dust floating in the air outside is also sometimes drawn into the inside of the device. When this dust adheres to the respective components of the optical system, the image quality of a projection image is deteriorated. In particular, dust is apt to adhere onto the surface of the light valve, which constitutes the optical modulation device, because the surface is electrically charged, and this is a great factor in deterioration of image quality. Furthermore, since the prism unit constituting the color synthesizing system is disposed immediately in front of the projection lens that enlarges and projects an image, adhesion of dust to the prism unit is also a great factor in deterioration of image quality, in a manner similar to the light valve.

For this reason, dust has been prevented from entering the inside of the device by covering the air inlet with an air filter cover having a spongy air filter.

In such a conventional dust-resistant structure, however, the inside of the device is uniformly protected from dust by the air filter. Therefore, it is difficult to reliably protect the optical modulation device and the color synthesizing system, which have significant effects on image deterioration, separate from other sections inside the device.

SUMMARY OF THE INVENTION

One aspect of the present invention is to provide a projection display apparatus in which an optical modulation device and a color synthesizing system can be efficiently cooled. Another aspect of the present invention is to provide a projection display apparatus in which an optical modulation device and a color synthesizing system can be securely protected from dust.

A projection display apparatus according to the present invention has an optical system forming an optical image corresponding to image information by optically processing a light beam emitted from a light source and enlarging and projecting this optical image using a projection lens, and an outer casing housing this optical system. The optical system includes an optical modulation device modulating light beams of a plurality of colors according to the image information and emitting the light beams as modulated light beams, and a color synthesizing system synthesizing and emitting these modulated light beams to the projection lens. The outer casing is provided with an air inlet taking in cooling air from the outside so as to cool the optical modulation device and the color synthesizing system. A fan that takes in the cooling air from the air inlet is disposed on the opposite side of the air inlet sandwiching the optical modulation device and the color synthesizing system.

According to the present invention, the optical modulation device and the color synthesizing system are cooled by cooling air on the suction side of the fan. Therefore, it is possible to uniformly cool the optical modulation device and the color synthesizing system, and to thereby greatly improve the cooling efficiency. Even if the cooling air on the suction side is swirling in the form of a vortex, since it flows in a direction such that it is collected toward the fan, most of the cooling air taken in from the air inlet is used to cool the optical modulation device and the color synthesizing system, whereby the optical modulation device and the color synthesizing system can be efficiently cooled.

In the above embodiment, it is preferable that the optical system has a color separation system separating a light beam from the light source into light beams of a plurality of colors and emitting the light beams to the optical modulation device, an outer casing incorporating a structure bearing the optical modulation device and the color synthesizing system, an optical component housing disposed adjacent to the structure for housing the color separation system, and a fan mounted on the optical component housing.

That is, the structure fixing the optical modulation device and the color synthesizing system is provided with the projection lens as well as the optical modulation device and the color synthesizing system. Since this projection lens is heavy, an integrally molded piece made of metal, such as magnesium, is adopted as the structure. On the other hand, since the optical component housing contains only relatively light components, such as dichroic mirrors, lenses and the like that constitute the color separation system, it is normally made of plastic. Therefore, when the fan is mounted on the optical component housing made of plastic, it can be easily attached to the optical component housing, which facilitates the manufacturing of the projection display apparatus. In addition, since the fan is not disposed on the underside of the structure, as distinct from the conventional art, there is no need to attach the fan to the structure that is an integrally molded metal piece, which simplifies the shape of the structure.

In this optical system, it is preferable that the air inlet be formed on the lower surface of the outer casing, and that the fan be disposed in the upper part inside the outer casing sandwiching the optical modulation device and the color synthesizing system and mounted on the optical component housing. That is, the respective separated color beams emitted from the color separation system need to be incident on the front of the optical modulation device and the color synthesizing system. For this reason, the height of the optical component housing in which the color separation system is contained is set to be greater than that of the optical modulation device and the color synthesizing system, and a dead space is thereby formed above the optical modulation device and the color synthesizing system. Therefore, the components inside the projection display apparatus can be efficiently arranged without waste by placing the fan in this dead space, and this can contributes to size reduction of the projection display apparatus. Furthermore, since the air inlet is formed on the lower surface of the outer casing, dust or the like in the air outside does not easily adhere and intrude, which further promotes dust protection of the inside of the device.

Furthermore, it is preferable that a circuit substrate controlling the optical system be disposed above the optical system, and that the fan be disposed along the extending direction of the circuit substrate. It is particularly preferable that the circuit substrate face the blow-off surface of the fan.

That is, since the fan is disposed along the extending direction of the circuit substrate, it is possible to guide cooling air blown out of the fan along the circuit substrate, and to greatly improve the cooling efficiency the circuit substrate. In particular, in the case in which the circuit substrate faces the blow-off surface of the fan, cooling of the circuit substrate is noticeably improved.

The present invention may also provide a projection display apparatus having a structure bearing the optical modulation device and a color synthesizing system provided with a suction opening for guiding cooling air for cooling these devices. The suction opening is also provided with a dustproof filter.

According to the present invention, since the structure fixing the optical modulation device and the color synthesizing system is provided with the dustproof filter, it is possible to securely protect the optical modulation device and the color synthesizing system, separate from other sections inside the device.

In this case, it is preferable that an engaging projection be formed on the outer periphery of the dustproof filter, that an engaging hole be formed near the peripheral edge of the suction opening so as to be engaged with the engaging projection, and that the dustproof filter be held detachably from the structure.

That is, since the dustproof filter is detachable from the structure, it can be removed separately from the inside of the projection display apparatus. When the dustproof filter becomes clogged or the like, it can be detached and easily cleaned or replaced. Furthermore, the dustproof filter can be easily attached to the structure during the process of manufacturing the projection display apparatus, which simplifies the manufacturing process.

Moreover, it is preferable that an exhaust opening be formed on the opposite side of the suction opening sandwiching the optical modulation device and the color synthesizing system. The exhaust opening may also be provided with a dustproof filter.

That is, the color separation system is normally housed in a light guide disposed adjacent to the structure which serves as an optical component housing. This light guide is placed to surround the optical modulation device and the color synthesizing system and has an exhaust opening on the opposite side of the suction opening sandwiching the optical modulation device and the color synthesizing system.

In this case, the components of the optical system including the color separation system, the optical modulation device, and the color synthesizing system, can be separated from other components inside the device by covering the suction opening and the exhaust opening with a dustproof filter, which makes it possible to securely protect the optical system from dust. When dust protection of the optical system is thus achieved, it is possible to assemble the projection display apparatus without paying close attention to the entry of dust into the optical system during the process of manufacturing the projection display apparatus after the optical system has been assembled, and to thereby simplify the manufacturing process.

When the optical system and the structure are housed in the outer casing and the outer casing is provided with the air inlet taking in cooling air from outside the device, it is preferable that the dustproof filter be placed to cover the air inlet.

That is, when the dustproof filter is thus disposed to cover the air inlet, it is possible to prevent dust from entering from the air inlet and entering sections, such as the power supply and the circuit substrate, other than the optical system including the optical modulation device and the color synthesizing system, and to thereby simplify the structure protecting the inside of the device from dust.

Since the optical modulation device and the color synthesizing system can be efficiently cooled and securely protected from dust by combining the fan and the dustproof filter described above, it is possible to ensure a good environment and to achieve a reliable projection display apparatus.

BRIEF DESCRIPTION OF THE DRAWINGS

FIG. 9 is an external perspective view showing the bottom face of the assembly of the embodiment in which the optical modulation device, the color synthesizing system, and the projection lens unit are mounted.

DETAILED DESCRIPTION OF PREFERRED EMBODIMENTS

An embodiment of the present invention will be described below with reference to the drawings.

Figure 1:
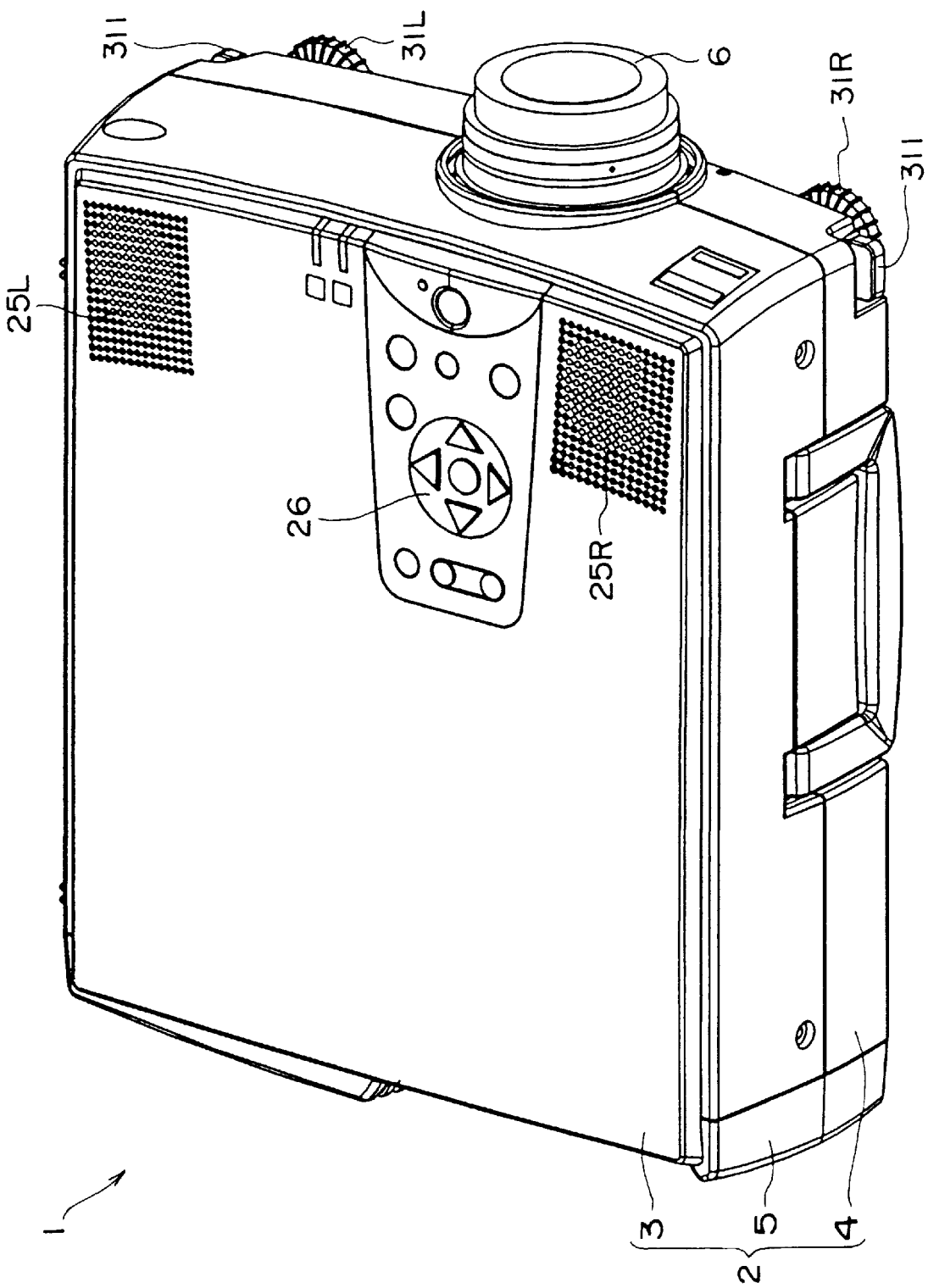
FIG. 1 is an external perspective view of a projection display apparatus according to an embodiment of the present invention, as viewed from the top side.
Figure 2:
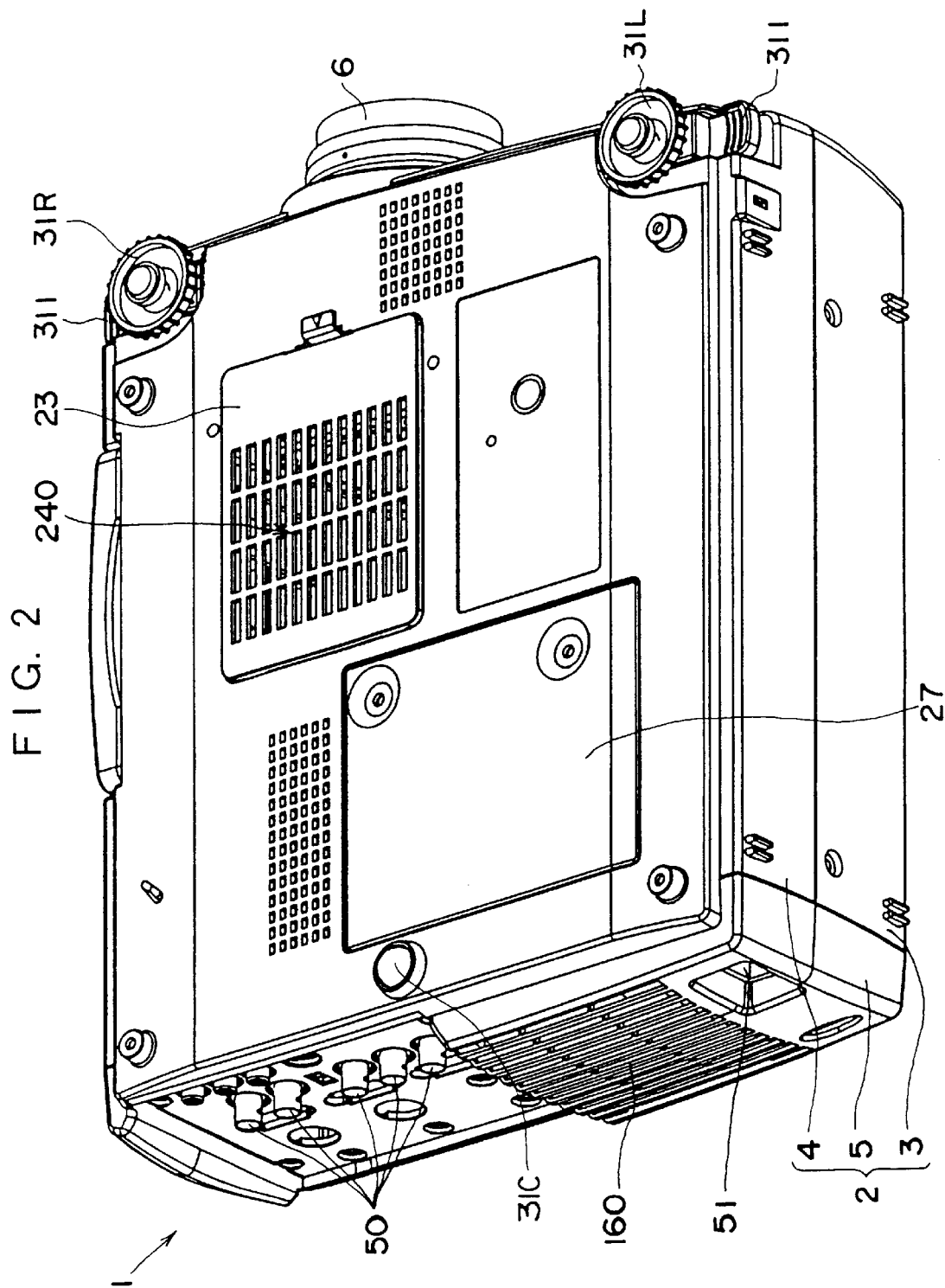
FIG. 2 is an external perspective view of the projection display apparatus according to the embodiment, as viewed from the bottom side.

FIGS. 1 and 2 are schematic perspective views of a projection display apparatus 1 according to an embodiment of the present invention. FIG. 1 is a perspective view, as viewed from the top side, and FIG. 2 is a perspective view, as viewed from the bottom side.

Figure 3:
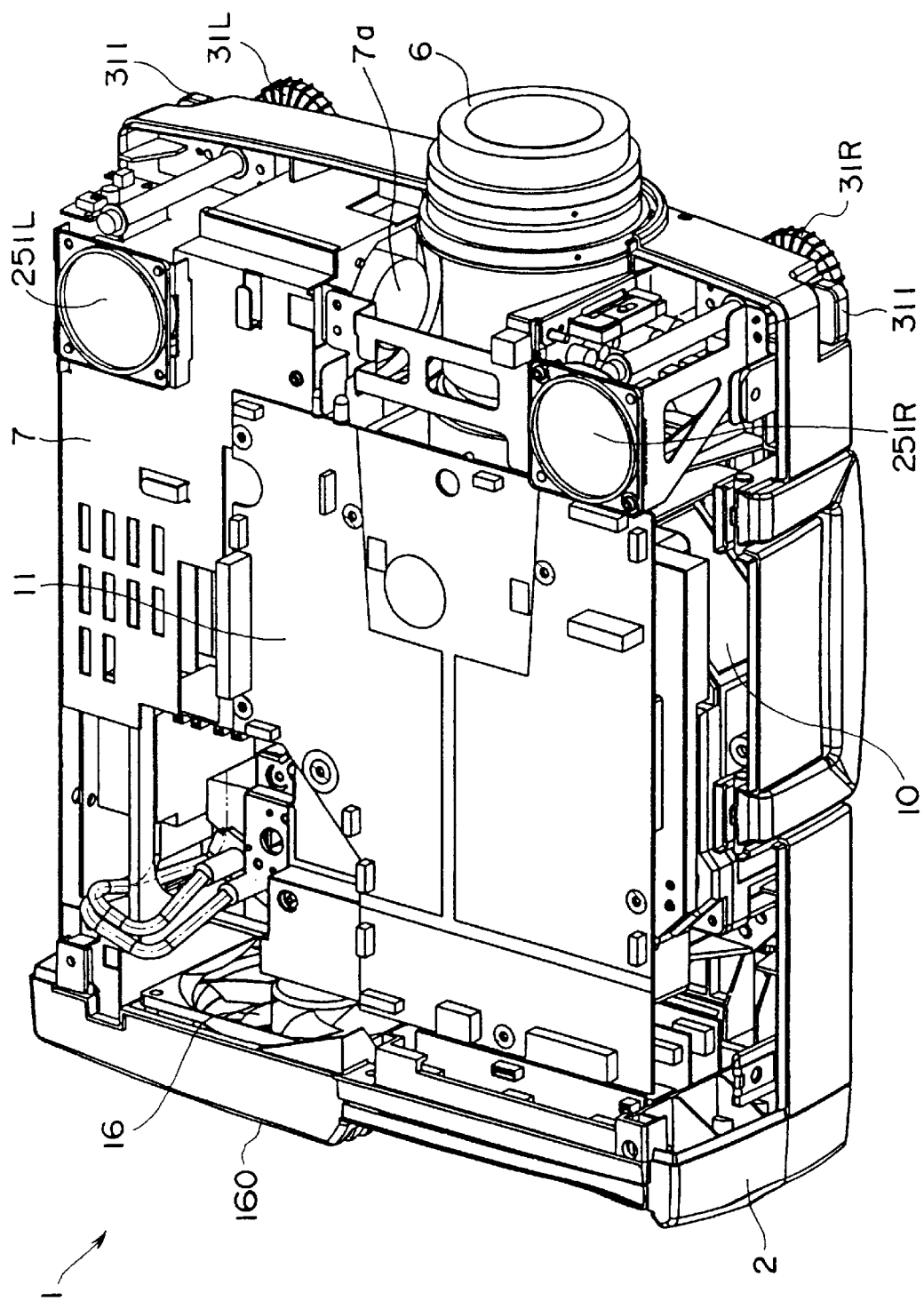
FIG. 3 is a perspective view showing the internal configuration of the projection display apparatus according to the embodiment.

The projection display apparatus 1 separates a light beam emitted from a light-source lamp unit (light source) into beams of the three primary colors, red (R), green (G), and blue (B), modulates these respective colored beams by liquid crystal light valves (optical modulation devices) according to image information, synthesizes the respective modulated colored beams by a prism (a color synthesizing system), and enlarges and projects the synthesized beams onto a projection plane via a projection lens unit 6. The components of an optical unit 10 (as shown in FIG. 3) which serve as part of an optical system with the projection lens unit 6, are housed inside an outer casing 2.

The outer casing 2 basically comprises an upper casing 3 covering the top face of the device, a lower casing 4 forming the bottom face of the device, and a rear casing 5 covering the back face.

As shown in FIG. 1, many communication holes 25R and 25L are formed at the right and left front ends of the top face of the upper casing 3. In about the center of the top face of the upper casing 3, a control switch 26 is disposed to control image quality, focus, and the like of the projection display apparatus 1.

As shown in FIG. 2, the bottom face of the lower casing 4 is provided with a lamp replacement cover 27 through which a light-source lamp unit 8 (which will be described later) held inside is replaced, and an air filter cover 23 having an air inlet 240 for cooling the inside of the device.

The bottom face of the lower casing 4 is also provided with feet 31R and 31L at the right end left front corners, and a foot 31C at about the rear center end, as shown in FIG. 2.

The feet 31R and 31L can be projected or retracted in the projecting direction by raising levers 311 up. This allows the position of the projection plane on a screen to be vertically changed.

In the rear casing 5, an AC inlet 51 for an external power supply is disposed on the right side, and a group of various kinds of input-output terminals 50 are arranged. An air outlet 160 is formed adjacent to these input-output terminals 50 so as to exhaust air inside the device therethrough.

Figure 4:
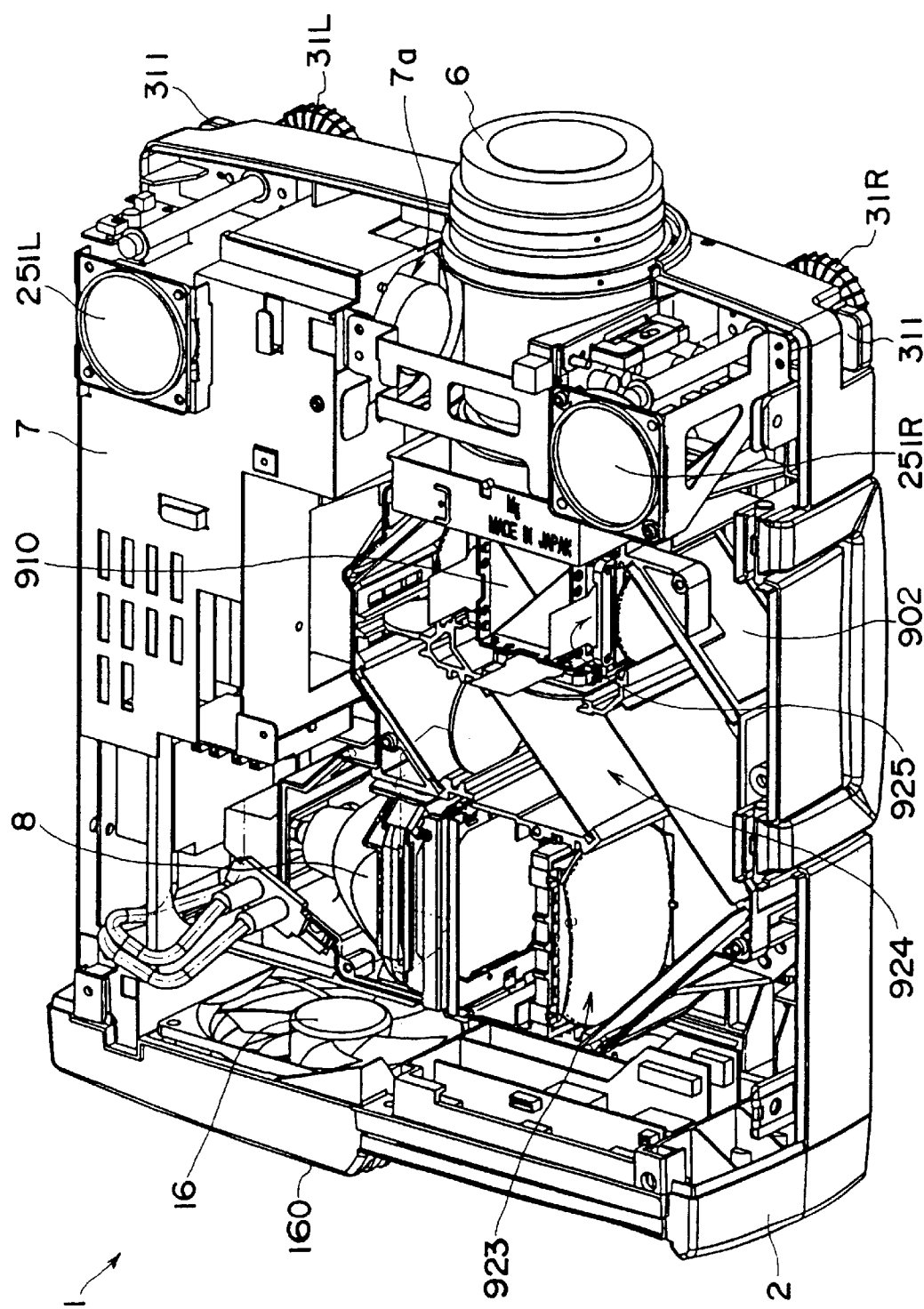
FIG. 4 is a perspective view of an optical system inside the projection display apparatus of the embodiment.
Figure 5:
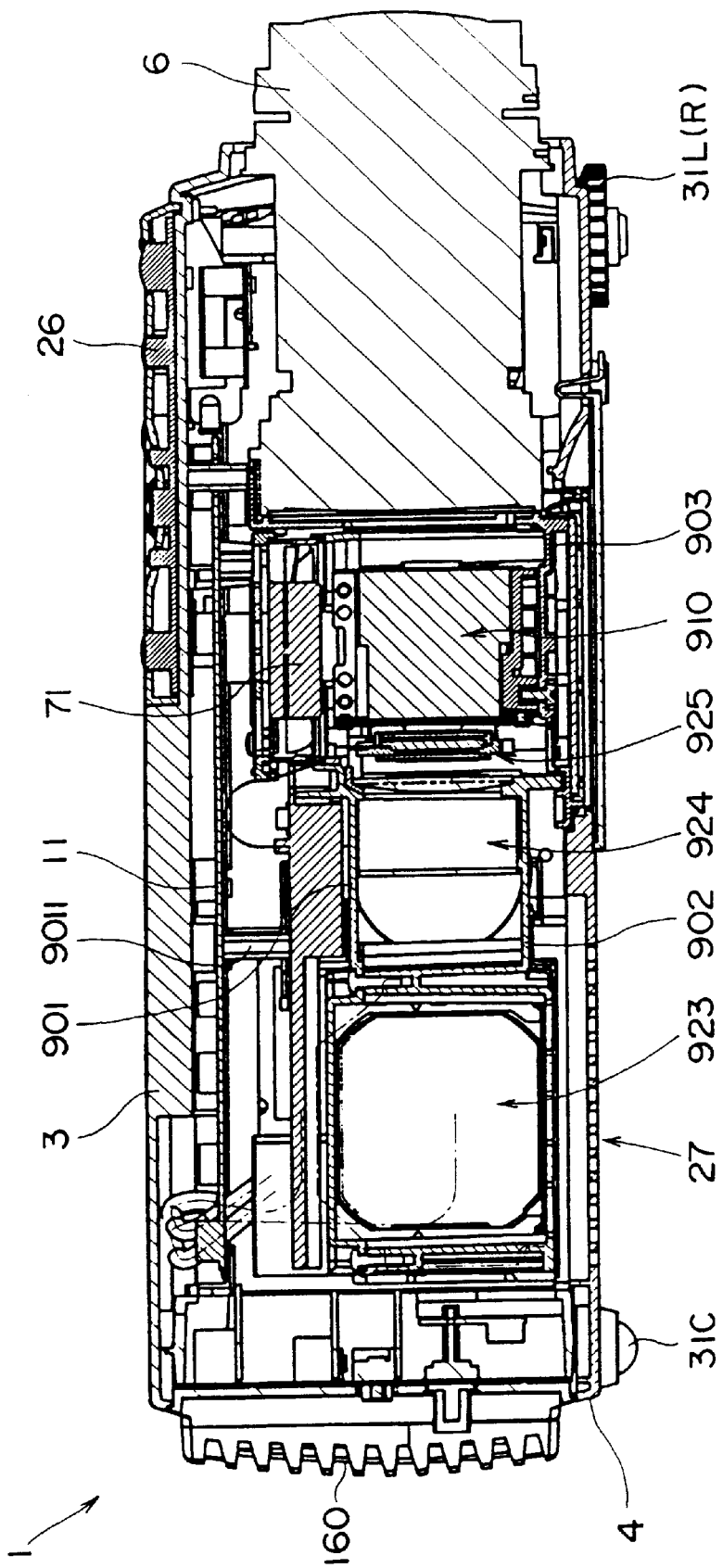
FIG. 5 is a vertical sectional view of the projection display apparatus of the embodiment.

FIGS. 3 to 5 show the inner configuration of the projection display apparatus 1. FIGS. 3 and 4 are schematic perspective views showing the inside of the device, and FIG. 5 is a vertical sectional view of the projection display apparatus 1.

As these figures show, the light-source lamp unit 8 serving as a light source, the optical unit 10 serving as an optical system, a circuit substrate 11, and a power supply unit 7 are arranged inside the outer casing 2.

The light-source lamp unit 8 constitutes a light-source section of the projection display apparatus 1. The light-source lamp unit 8 includes a light source device composed of a light-source lamp and a reflector, and a lamp housing housing this light source device (not shown in these figures), and is structured so that it can be entirely detached from the above-described lamp replacement cover 27.

The optical unit 10 is a unit that forms an optical image corresponding to image information by optically processing a light beam emitted from the light-source lamp unit 8, and comprises an illumination optical system 923, a color separation system 924, an optical modulation device 925, and a prism unit 910 serving as a color synthesizing system. The optical elements in the optical unit 10 other than the optical modulation device 925 and the prism unit 910 are vertically held between upper and lower light guides 901 and 902 that serve as optical component housings. These upper and lower light guides 901 and 902 are fixed to the side of the lower casing 4 by fixing screws. These light guides 901 and 902 are also fixed to the side of the prism unit 910 by fixing screws in a similar manner.

Figure 6:
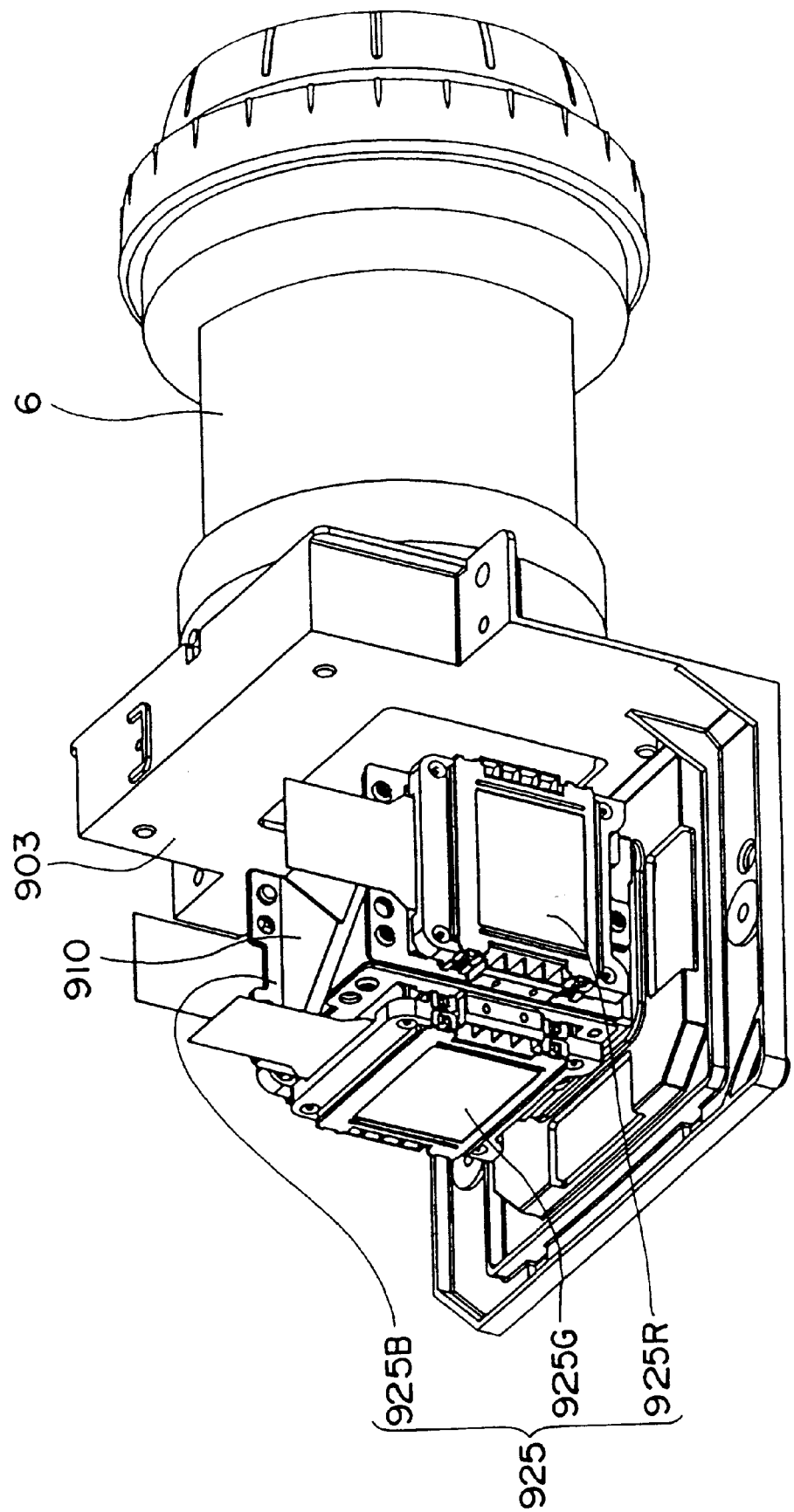
FIG. 6 is an external perspective view of an assembly according to the embodiment in which an optical modulation device, a color synthesizing system, and a projection lens unit are mounted.

The prism unit 910 shaped like a rectangular parallelepiped is fixed by fixing screws to the back of a head plate 903 that is a structure formed of an integrally molded piece of magnesium and having a nearly L-shaped profile, as shown in FIG. 6. Respective color light valves 925R, 925G, and 925B that constitute the optical modulation device 925 are placed to face three side faces of the prism unit 910, and fixed to these side faces. Furthermore, the base end of the projection lens unit 6 is similarly fixed to the front of the head plate 903 by fixing screws. The head plate 903, which is thus equipped with the prism unit 910, the optical modulation device 925, and the projection lens unit 6, is fixed on the lower casing 4 by fixing screws.

The circuit substrate 11 serves to control the light-source lamp, the liquid crystal light valves 925R, 925G, and 925B, and the like described above. As shown in FIGS. 3 to 5, the circuit substrate 11 is disposed above the optical unit 10, electrically connected to the control switch 26 disposed in the upper casing 3 on the front side of the device, and electrically connected to the input-output terminals 50 in the rear casing 5 on the back side of the device. A rod-like projection 9011 is formed on the upper surface of the upper light guide 901, and the circuit substrate 11 is disposed on this projection 9011. The projection 9011 forms a predetermined space between the circuit substrate 11 and the light guide 901 so that air cooling can circulate along the circuit substrate 11.

The power supply unit 7 serves to supply electric power to the optical unit 10 and the light-source lamp unit 8. The power supply unit 7 is disposed on the side of the optical unit 10, and is electrically connected to the AC inlet 51 in the rear casing 5 on the rear side of the device. This power supply unit 7 also supplies electric power to speakers 251R and 251L for voice output that are positioned corresponding to the communication holes 25R and 25L formed through the upper casing 3, an exhaust fan 16 adjacent to the light-source lamp unit 8, and a suction fan 71 that will be described later. On the side face of the power supply unit 7 facing the projection lens unit 6, a suction fan 7a is disposed.

Figure 7:
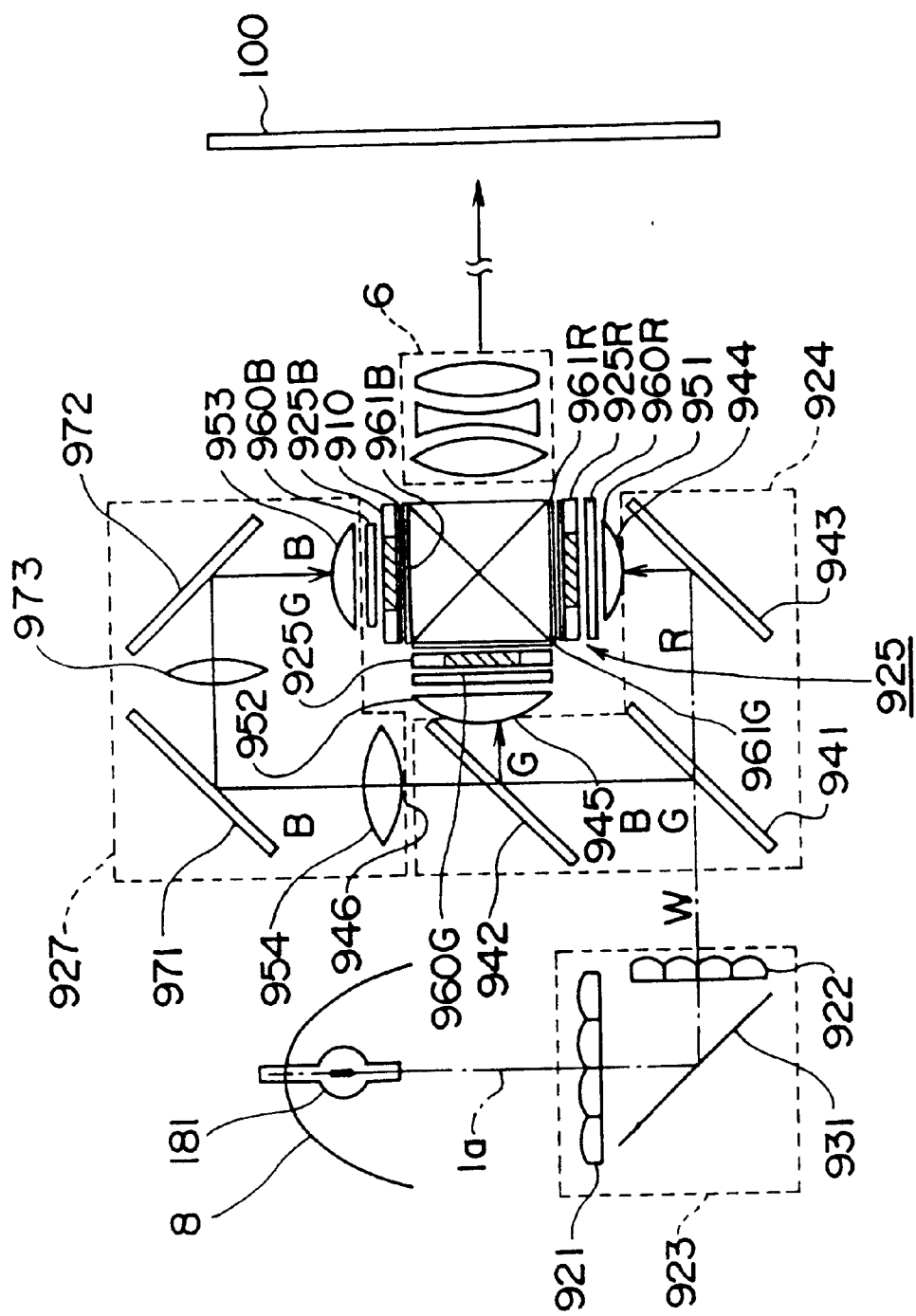
FIG. 7 is a schematic view explaining the configuration of the optical system in the projection display apparatus of the embodiment.

Next, the configuration of the optical system in the projection display apparatus 1 will be described with reference to FIG. 7 as a schematic view.

As described above, the optical unit 10 comprises the illumination optical system 923 uniformizing the in-plane illumination distribution of a light beam (W) from the light-source lamp unit 8, the color separation system 924 separating the light beam (W) from the illumination optical system 923 into red (R), green (G), and blue (B), the optical modulation device 925 modulating the respective color beams R, G, and B according to image information, and the prism unit 910 that serves as the color synthesizing system synthesizing the respective modulated color beams.

The illumination optical system 923 includes a reflecting mirror 931 for bending an optical axis 1a of the light beam W emitted from the light-source lamp unit 8 toward the front of the device, and a first lens plate 921 and a second lens plate 922 disposed on both sides of the reflecting mirror 931.

The first lens plate 921 includes a plurality of rectangular lenses arranged in a matrix, splits the light beam emitted from the light source into a plurality of partial beams, and collects the respective partial beams near the second lens plate 922.

The second lens plate 922 includes a plurality of rectangular lenses arranged in a matrix, and has the function of superimposing the respective partial beams emitted from the first lens plate 921 onto the light valves 925R, 925G, and 925B (which will be described later) which constitute the optical modulation device 925.

In this way, since the liquid crystal light valves 925R, 925G, and 925B can be illuminated with light having substantially uniform illuminance by the illumination optical system 923 in the projection display apparatus 1 of this embodiment, it is possible to achieve a projection image whose illuminance is uniform.

The color separation system 924 includes a blue and green reflecting dichroic mirror 941, a green reflecting dichroic mirror 942, and a reflecting mirror 943. First, a blue beam B and a green beam G contained in the light beam W emitted from the illumination optical system 923 are perpendicularly reflected by the blue and green reflecting dichroic mirror 941, and travel toward the green reflecting dichroic mirror 942.

A red beam R passes through the blue and green reflecting dichroic mirror 941, is perpendicularly reflected by the reflecting mirror 943 disposed behind, and emerges from an emitting portion 944 for the red beam R toward the prism unit 910. Next, only the green beam G of the blue and green beams B and G reflected by the blue and green reflecting dichroic mirror 941 is perpendicularly reflected by the green reflecting dichroic mirror 942, and emerges from an emitting portion 945 for the green beam G toward the color synthesizing system. The blue beam B passed through the green reflecting dichroic mirror 942 emerges from an emitting portion 946 for the blue beam B toward a relay lens system 927. In this embodiment, the distances from an emitting portion of the illumination optical system 923 for the light beam W to the emitting portions 944, 945, and 946 of the color separation system 924 for the respective color beams are set to be equal.

On the emitting sides of the emitting portions 944 and 945 of the color separation system 924 for the red and green beams R and G, light-collecting lenses 951 and 952 are disposed, respectively. Therefore, the red and green beams R and G emitted from the respective emitting portions enter these light-collecting lenses 951 and 952, and are thereby collimated.

The red and green beams R and G thus collimated pass through incident-side polarizers 960R and 960G, and enter the liquid crystal light valves 925R and 925G, where they are modulated and given corresponding image information. That is, these liquid crystal light valves are subjected to switching control according to image information by a driving device (not shown), thereby modulating the respective color beams passing therethrough. In contrast, the blue beam B is guided to the corresponding liquid crystal light valve 925B via the relay lens system 927, and is similarly subjected to modulation according to image information. As the liquid crystal light valves 925R, 925G, and 925B of this embodiment, liquid crystal light valves may be adopted that use a polysilicon TFT as a switching element, for example.

The relay lens system 927 comprises a light-collecting lens 954 disposed on the emitting side of the emitting portion 946 for the blue beam B, an incident-side reflecting mirror 971, an emitting-side reflecting mirror 972, an intermediate lens 973 interposed between these reflecting mirrors, and a light-collecting lens 953 disposed before the liquid crystal light valve 925B. The blue beam B emerging from the lightcollecting lens 953 passes through an incident-side polarizer 960B, and enters the liquid crystal light valve 925B, where it undergoes modulation. The blue beam B has the longest one of the optical path lengths of the respective color beams, namely, the distances from the light-source lamp 181 to the liquid crystal light valves 925R, 925G, and 925B. Therefore, this light beam undergoes the largest light loss. The light loss can, however, be reduced by interposing the relay lens system 927.

Then, the respective color beams R, G, and B modulated by the respective liquid crystal light valves 925R, 925G, and 925B pass through emitting-side polarizers 961R, 961G, and 961B, and enter the prism unit 910, where they are synthesized. A color image formed by synthesis by the prism unit 910 is enlarged and projected via the projection lens unit 6 onto a projection plane 100 that is disposed at a predetermined position.

Figure 8:
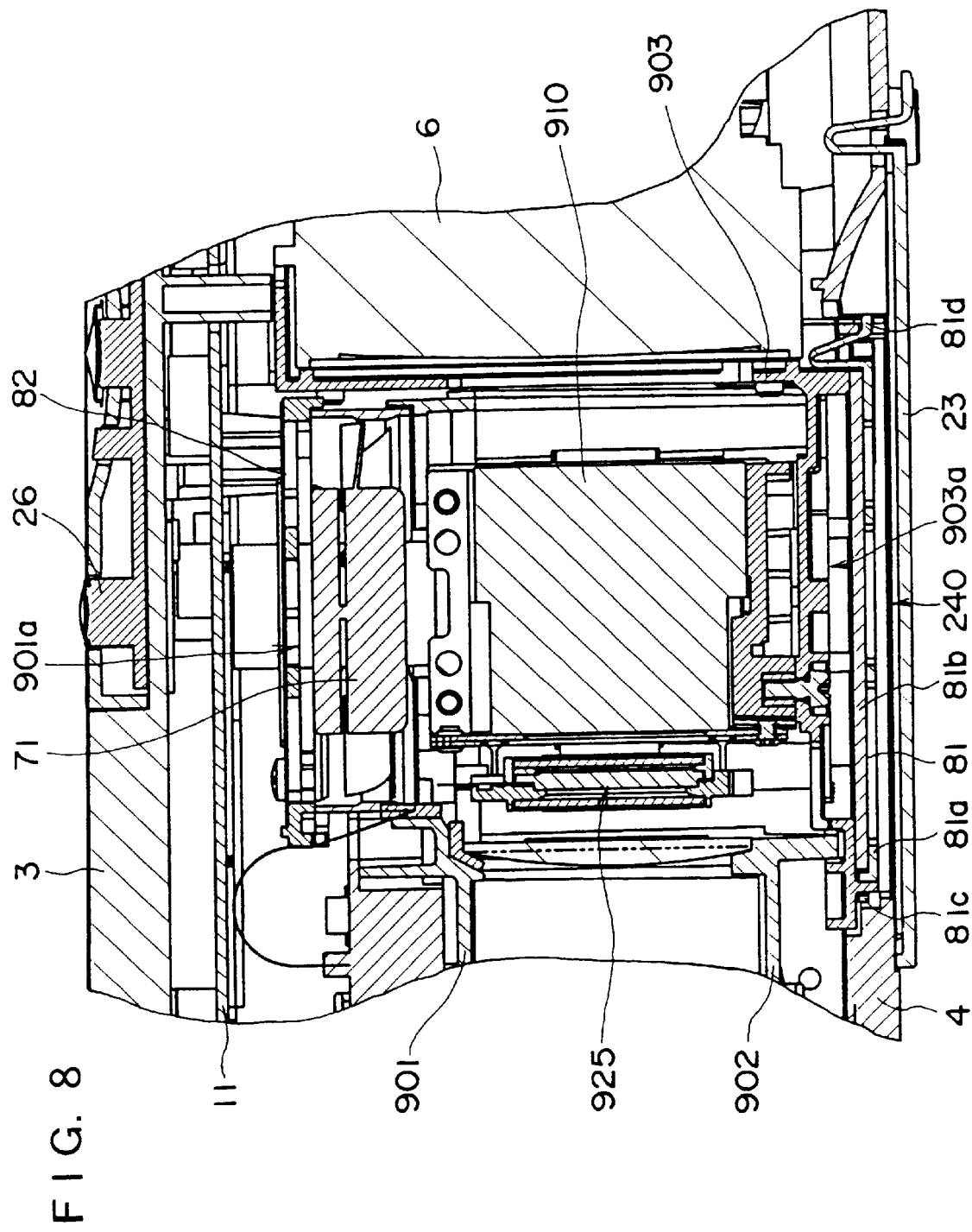
FIG. 8 is a partially sectional view explaining a cooling structure in the projection display apparatus of the embodiment.

Next, a description will be given of a structure for cooling the inside of the projection display apparatus 1 described above. As shown in FIG. 8 as a partial sectional view, the optical modulation device 925 and the prism unit 910 are disposed via the above-described head plate 903 above the air inlet 240 that is formed in the bottom face of the lower casing 4. Above these devices, the suction fan 71 is disposed to take in cooling air from the air inlet 240.

On the underside of the head plate 903, a suction opening 903a guiding cooling air to the optical modulation device 925 and the prism unit 910 is formed corresponding to the planar position of the air inlet 240 in the lower casing 4. As shown in FIG. 9, a suction-side dustproof filter 81 is provided in the suction opening 903a, and held detachably from the head plate 903.

The suction-side dustproof filter 81 may be formed by bonding a sponge 81b to a rectangular frame 81a made of ABS resin, and has on its outer periphery two engaging projections 81c, and a fitting projection 81d that bends inward in the plane of the suction-side dustproof filter 81, for example.

On the other hand, a rib 903b is formed on the underside of the head plate 903 so that it surrounds the outer periphery of the suction opening 903a. The rib 903b has, on its rear side face, two engaging holes 903c in which the engaging projections 81c are to be inserted, and has on its front side face a fitting hole (not shown) in which the fitting projection 81d is to be inserted.

In attaching the suction-side dustproof filter 81 to the head plate 903, the engaging projections 81c are inserted in the engaging holes 903c, and the suction-side dustproof filter 81 is mounted inside the rib 903b in a state in which the fitting projection 81d is bending inward. After the mounting, the fitting projection 81d expands outward because of elasticity, and is fitted and held in the fitting hole. As described above, since the head plate 903 is directly and fixedly screwed to the lower casing 4, the above-described suction-side dustproof filter 81 is located between the underside of the head plate 903 and the inner surface of the lower casing 4 in the outer casing 2 so that it covers the air inlet 240.

The upper and lower light guides 901 and 902 are disposed adjacent to the head plate 903. The side faces of the optical modulation device 925 and the prism unit 910 are covered with the side wall of the lower light guide 902, and the tops thereof are covered with the upper light guide 901. The suction fan 71 is disposed on the underside of the upper light guide 901, as shown in FIG. 8, and is structured to suck air between the optical modulation device 925 and the prism unit 910, with its lower side used for suction and its upper side used for blow-off. Moreover, an exhaust opening 901a is formed in the upper light guide 901 corresponding to the fixed position of the suction fan 71. The upper surface of the exhaust opening 901a is covered with an exhaust-side dustproof filter 82 formed of metal mesh.

The circuit substrate 11 is disposed above the suction fan 71, and the suction fan 71 is placed along the extending direction of the circuit substrate 11. The circuit substrate 11 is disposed to face the blow-off surface of the suction fan 71 through the exhaust opening 901a.

Next, the flow of cooling air will be described with reference to FIGS. 5 and 8.
(a) Cooling air is forcibly taken into the inside of the device through the air inlet 240 by the rotation of the suction fan 71.
(b) After the taken-in cooling air is cleared of dust by the suction-side dustproof filter 81, it is guided to the optical modulation device 925 and the prism unit 910 via the suction opening 903a, thereby cooling these devices. Since the optical modulation device 925 and the prism unit 910 are surrounded by the side wall of the lower light guide 902, the side wall functions as a duct, and most of the cooling air is guided to the optical modulation device 925 and the prism 910.
(c) The cooling air is exhausted from the exhaust opening 901a after cooling the optical modulation device 925 and the prism unit 910.
(d) The cooling air exhausted from the exhaust opening 901a is blown against the circuit substrate 11, and flows toward the rear side of the device along the extending direction of the circuit substrate 11, thereby cooling the circuit substrate 11.
(e) The cooling air passed under the circuit substrate 11 is supplied to the light-source lamp unit 8, cools the light-source lamp unit 8, and is then exhausted to the outside of the device by the exhaust fan 16 and the air outlet 160.

Regarding cooling of the power supply unit 7, cooling air is taken in from the space between the projection lens unit 6 and the outer casing 2 by the built-in suction fan 7a, and is exhausted from the side face of the unit on the rear side of the device. After cooling the light-source lamp unit 8, the cooling air is exhausted to the outside of the device by the exhaust fan 16 in a manner similar to the above.

The above-described embodiment provides the following advantages.

That is, the suction fan 71 is disposed on the opposite side of the air inlet 240 with the optical modulation device 925 and the prism unit 910 therebetween. Thus, the optical modulation device 925 and the prism unit 910 are uniformly cooled by cooling air on the suction side of the suction fan 71 which greatly improves the cooling efficiency. In addition, even if the cooling air flows in the form of a vortex on the suction side, it flows to be collected toward the suction fan 71. Therefore, most of the cooling air taken in from the air inlet 240 is used to efficiently cool the optical modulation device 925 and the color synthesizing system.

Since the suction fan 71 is disposed on the underside of the upper light guide 901 made of plastic, it can be easily attached to the upper light guide 901, which facilitates the manufacturing of the projection display apparatus 1. Moreover, since the suction fan is not disposed on the underside of the head plate 903, as distinct from the conventional projection display apparatus, there is no need to form mounting holes or the like in the head plate 903 that is an integrally molded metal piece, which makes it possible to simplify the shape of the head plate 903, and to thereby reduce the manufacturing cost.

Furthermore, since the suction fan 71 is disposed in the upper space inside the outer casing 2 between the prism unit 910 and the upper light guide 901, the space efficiency of the inside of the outer casing 2 is improved, thereby reducing the size of the projection display apparatus 1. In addition, since the air inlet 240 is formed through the bottom face of the lower casing 4, dust or the like in the air outside does not easily adhere and intrude, which further improves the dust protection of the inside of the device.

Since the suction fan 71 is disposed along the extending direction of the circuit substrate 11, it is possible to guide cooling air blown off from the suction fan along the circuit substrate, and to thereby greatly improve the efficiency of cooling the circuit substrate 11. In particular, since the substrate surface of the circuit substrate 11 faces the blow-off surface of the suction fan 71, the cooling efficiency is noticeably improved. Moreover, a predetermined space is formed between the upper light guide 901 and the circuit substrate 11, and the use of this space allows cooling air to be passed to the light-source lamp unit 8 and the like, which are disposed on the rear side of the device, without providing a duct or the like. This contributes to simplification and size reduction of the internal structure of the projection display apparatus 1.

Since the head plate 903 for fixing the optical modulation device 925 and the prism unit 910, is provided with the dustproof filter 81, the optical modulation device 925 and the prism unit 910 can be separated from other components inside the device, and reliably protected from dust.

Since the dustproof filter 81 is detachable from the head plate 903, the suctionside dustproof filter 81 can be removed alone from the inside of the projection display apparatus 1. When the suction-side dustproof filter 81 is clogged, or encounters other problems, it can be easily removed for cleaning and replacement. Moreover, the suction-side dustproof filter 81 can be easily attached to the head plate 903 during the process of manufacturing the projection display apparatus 1, thereby simplifying the manufacturing process.

Since the suction opening 903*a* and the exhaust opening 901*a* are provided with the dustproof filters 81 and 82, respectively, the components of the optical system including the color separation system 924, the optical modulation device 925, and the color synthesizing system 910 can be separated from other components inside the device, whereby the optical unit 10 can be reliably protected from dust. Such achievement of dust protection of the optical unit 1 makes it possible to assemble the projection display apparatus 1 without paying close attention to the entry of dust into the optical system during the manufacturing process of the projection display apparatus 1 after the optical unit 10 has been assembled, and to thereby simplify the manufacturing process.

Since the suction-side dustproof filter 81 is disposed to cover the air inlet 240, it can prevent dust from entering the components inside the device other than the optical unit 10, thereby simplifying the dustproof structure inside the device.

The present invention is not limited to the above-described embodiment, and is also intended to encompass the following modifications.

That is, while the air inlet 240 is formed through the underside of the outer casing 2 and the suction fan 71 is disposed in the upper part of the device in the above-described embodiment, the air inlet may be formed in the side face of the outer casing, and the suction fan 71 may be disposed in an area on the opposite side sandwiching the optical modulation device and the color synthesizing system.

While the suction fan 71 is disposed on the opposite side of the air inlet 240 across the optical modulation device 925 and the prism unit 910 in the abovedescribed embodiment, the arrangement is not limited to the above. That is, the suction fan may be disposed at the air inlet 240, and the suction opening 903*a* of the head plate 903. In this case, it is preferable that the air filter cover 23 be further provided with a dustproof filter in order to protect the power supply unit 7, the circuit substrate 11, and the like.

While the suction fan 71 is disposed on the upper light guide 901 in the above-described embodiment, it may be placed in the upper part of the inside of the device by an independent support structure.

While the suction-side dustproof filter 81 is detachable from the head plate 903 in the above-described embodiment, it may be fixed with an adhesive or the like. The suction-side dustproof filter may be put on the air filter cover for covering the air inlet.

While the suction-side dustproof filter 81 has the sponge 81*b* in the above-described embodiment, it may be formed using a reticular conductive member such as a metal mesh. In this case, fine dust that enters the inside of the device can also be captured by charging the metal mesh or the like with electricity.

Furthermore, other specific structures, shapes, and the like, may be used in carrying out the present invention as long as the objects of the present invention are achieved.

What is claimed is:

1. A projector, comprising:
    an optical system that forms an optical image corresponding to image information by optically processing a light bean; emitted from a light source and enlarging and projecting the optical image using a projection lens, and an outer casing housing said optical system, the optical system including:
    1) an optical modulation device that modulates light beams of a plurality of colors according to said image information and emits said light beams as modulated light beams; and
    2) a color synthesizing system that synthesizes and emits said modulated light beams to said projection lens,
    said outer casing having an air inlet that takes in cooling air from outside the projector so as to cool said optical modulation device and said color synthesizing system, and a fan that takes in cooling air from said air inlet, the fan being disposed on an opposite side of said outer casino from said air inlet with said optical modulation device and said color synthesizing system located therebetween, and said optical modulation device and said color synthesizing system being disposed on a suction side of said fan.

2. The projector according to claim 1, said optical system further including a color separation system that separates the light beam emitted from said light source into light beams of a plurality of colors and emits the light beams to said optical modulation device, said cuter casing incorporating therein a structure bearing said optical modulation device and said color synthesizing system, and an optical component housing disposed adjacent to said structure so as to house said color separation system, and said fan being mounted on said optical component housing.

3. The projector according to claim 1, wherein said optical system includes a color separation system that separates the light beam emitted from said light source into light beams of a plurality of colors and emits the light beams to said optical modulation device, said outer casing incorporating therein a structure bearing said optical modulation device and said color synthesizing system, and an optical component housing disposed adjacent to said structure so as to house said color separation system, said air inlet being formed on the lower surface of said outer casing, and said fan being disposed in the upper part of the inside of said outer casing above said optical modulation device and said color synthesizing system and mounted on said optical component housing.

4. The projector according to claim 1, further comprising a circuit substrate that controls said optical system, said circuit substrate being disposed above said optical system, and said fan being located such that it extends in a direction along said circuit substrate.

5. The projector according to claim 1, further comprising a circuit substrate that contrast said optical system, said circuit substrate being disposed above said optical system, said f being located such that it extends in a direction along said circuit substrate, and said circuit substrate facing a blow-off surface of said fan.

6. The projector according to claim 1, said optical system further including a color separation system that separates the light beam emitted from said light source into light beams of a plurality of colors and emitting the light beams to said optical modulation device, a circuit substrate that controls said optical system, said circuit substrate being disposed above said optical system, said outer casing incorporating therein a structure bearing said optical modulation device and said color synthesizing system, and an optical component housing being disposed adjacent to said structure so as to house said color separation system, said air inlet being formed on the lower surface of said outer casing, said fan being disposed in the upper part of the inside of said outer casing above said optical modulation device and said color synthesizing system, and mounted on said optical component housing such that it extends in a direction along said circuit substrate, and said circuit substrate facing a blow-off surface of said fan.

7. A projector, comprising:
an optical system that forms an optical image corresponding to image information by optically processing a light beam emitted from a light source and enlarging and projecting the optical image using a projection lens, said optical system including:
1) an optical modulation device that modulates light beams of a plurality of colors according to said image information and emits the light beams as modulated light beams; and
2) a color synthesizing system that synthesizes and emits said respective modulated light beams to said projection lens; and
3) a structure bearing said optical modulation device and said color synthesizing system having a suction opening to guide cooling air for cooling said devices, and said suction opening having a filter that prevents dust from entering the projector,
an engaging projection being formed on the outer periphery of said filter, an engaging hole being formed near the peripheral edge of said suction opening so as to be engaged with said engaging projection, and said filter being detachably held by said structure.

8. The projector according to claim 7, further comprising an exhaust opening formed on the opposite side of the projector from said suction opening with said optical modulation device and said color synthesizing system located therebetween, the exhaust opening having a filter that prevents dust from entering the projection display apparatus.

9. The projector according to claim 7, said optical system and said structure being housed in said outer casing, said outer casing having an air inlet that take in cooling air from outside the projector, and said filter being positioned to cover said air inlet.

10. The projector according to claim 7, said optical system and said structure being housed in said outer casing, said outer casing having an air inlet that takes in cooling air from outside the projector, an engaging projection formed on the outer periphery of said filter, an engaging hole formed near the peripheral edge of said suction opening so as to be engaged with said engaging projection, said filter being detachably held by said structure so as to cover said air inlet, and an exhaust opening formed on the opposite side of the projector from said suction opening with said optical modulation device and said color synthesizing system located therebetween, the exhaust opening having a filter that prevents dust from entering the projector.

* * * * *